UNITED STATES PATENT OFFICE 2,285,329

PREPARATION OF 2-CHLOROALLYL COMPOUNDS

Gerald H. Coleman and Robert W. Sapp, Midland, Mich., assignors to The Dow Chemical Company, Midland, Mich., a corporation of Michigan No Drawing. Application December 6, 1937, Serial No. 178,401

16 Claims. (Cl. 260—614)

This invention concerns an improved method of making certain compounds having the general formula $$CH_2=C(Cl)-CH_2-Y$$

wherein Y is a chlorine, hydroxyl, or 2-chloroallyloxy group. It also concerns a new compound, di-(2-chloroallyl) ether, preparable by the improved method. For convenience, the compounds having the above general formula are hereinafter referred to generically as "2-chloroallyl compounds."

It is known that 2-chloroallyl chloride may be obtained, along with other products, by carefully heating 1,2,3-trichloropropane to a reaction temperature with solid sodium or potassium hydroxide (cf. "Ann. Chim. Phys.", Series 3, vol. 60, page 38; "Annalen", vol. 135, page 359). During such operation a vigorous exothermic reaction occurs with splitting out of hydrogen chloride from the trichloropropane to form 2-chloroallyl chloride. Due to the vigor and exothermic nature of the reaction between trichloropropane and solid alkali, extremely careful heating is required to keep the reaction from taking place too rapidly. Moreover, by-products such as acrolein, propargyl chloride, etc., are produced when operating in such manner and the presence of the by-products renders subsequent purification of 2-chloroallyl chloride difficult.

We have now found that 1,2,3-trichloropropane may be reacted with a dilute, e. g. 5–20 per cent, aqueous solution or suspension of an alkali and that this reaction may be controlled without difficulty to produce 2-chloroallyl compounds in good yield and in readily purifiable form. The reaction occurs smoothly and is well adapted for large-scale operation.

The reaction of 1,2,3-trichloropropane with a dilute aqueous alkali produces a mixture of 2-chloroallyl chloride, $(CH_2=C(Cl)CH_2Cl)$, 2-chloroallyl alcohol $(CH_2=C(Cl)CH_2OH)$, and di-(2-chloroallyl) ether $$(CH_2=C(Cl)CH_2-O-CH_2(Cl)C=CH_2)$$

These compounds may readily be separated by fractional distillation. If desired, however, the reaction may be controlled to produce a major proportion of any of these compounds. Thus, 2-chloroallyl chloride may be prepared in yields as high as 85 per cent of theoretical by reacting 1,2,3-trichloropropane with a dilute aqueous alkali containing from 1 to 2 chemical equivalents of the alkali. The reaction for the formation of the 2-chloroallyl chloride is illustrated by the equation:

$$ClCH_2CH(Cl)CH_2Cl \rightarrow CH_2=C(Cl)-CH_2Cl+HCl$$

Any alkali, e. g. sodium hydroxide, calcium hydroxide, borax, sodium carbonate, iron hydroxide, etc., may be employed as the hydrolytic agent. The proportion of water may be varied widely, but we ordinarily employ between 10 and 50 moles of water per mole of 1,2,3-trichloropropane.

2-chloroallyl alcohol is obtained as the major product when 2 or more chemical equivalents of a salt of a strong base and a weak acid, dissolved in between 10 and 50 molecular equivalents of water is employed as the hydrolytic agent. Such salts include sodium carbonate, tri-sodium phosphate, potassium bicarbonate, sodium acetate, borax, etc. The reaction for the formation of 2-chloroallyl alcohol is illustrated by the equation:

$$CH_2ClCH(Cl)CH_2Cl+H_2O \rightarrow CH_2=C(Cl)CH_2OH+2HCl$$

When 1,2,3-trichloropropane is treated with 1.5 or more, preferably about 2, chemical equivalents of an alkali metal hydroxide, e. g. sodium or potassium hydroxide, in 15–35 per cent by weight aqueous solution, di-(2-chloroallyl) ether is obtained in substantial yield. Its formation may be illustrated by the equation:

$$2CH_2ClCHClCH_2Cl+H_2O \rightarrow CH_2=CClCH_2-O-CH_2CCl=CH_2+4HCl$$

Di-(2-chloroallyl) ether may also be prepared by reacting 2-chloroallyl chloride with a 15–35 per cent aqueous solution of an alkali metal hydroxide.

Di-(2-chloroallyl) ether is a colorless, mobile liquid with a characteristic odor. It may be used as an intermediate in the preparation of other organic chemicals. Upon heating, it polymerizes to a tough, black, rubber-like solid, insoluble in benzene, ethanol, ethylene dichloride, acetone, and other common solvents. The polymer may be compounded with gums, waxes, fillers, plasticizing agents, etc., to form plastic masses useful in the arts.

The foregoing reactions are preferably carried out by heating a mixture of 1,2,3-trichloropropane, water, and the desired alkaline agent at reflux temperature, e. g. 75°–110° C. for from 2–60 hours, but they may be carried out in shorter time by heating the mixture under pressure in a bomb or autoclave at temperatures above its normal boiling point, e. g. 135°–175° C.

After completion of the reaction, the reaction mixture is washed with water to remove inorganic salts, excess alkaline agent, etc., and fractionally distilled to separate and purify the products of the hydrolysis.

The following examples illustrate various ways in which the principle of our invention has been applied, but are not to be construed as limiting the invention:

Example 1

A mixture of 1242 grams (8.42 mols) of 1,2,3-trichloropropane, 688 grams (17.2 mols) of sodium hydroxide, and 1800 grams (100 mols) of water was heated at reflux temperature for 10 hours in a 3-necked flask equipped with a stirrer, thermometer, and reflux condenser. The temperature of reflux was 87°–105° C. After completion of the reaction, the product was distilled from the flask and allowed to separate into two layers. The lower water-insoluble layer was drawn off, washed with water, and fractionally distilled. There was obtained 328 grams of 2-chloroallyl chloride, distilling at approximately 94° C.; 126 grams of di-(2-chloroallyl) ether, distilling at approximately 114° C. under 118 millimeters pressure; and a small amount of unreacted 1,2,3-trichloropropane. 168 grams of 2-chloroallyl alcohol, B. P. 135° C., was obtained from the water layer of the crude distillate by saturating the same with potassium carbonate and fractionally distilling the material which salted out.

Example 2

A mixture of 475 grams (3.2 mols) of 1,2,3-trichloropropane, 132 grams (3.3 mols) of sodium hydroxide, and 1200 grams (66.6 mols) of water was heated at reflux temperature for 2¾ hours in a 3-necked flask fitted with a stirrer, thermometer, and reflux condenser. The temperature of reflux was 82°–85° C. After completion of the reaction, the reaction product was distilled from the flask and allowed to separate into two layers. The lower, water-insoluble layer was drawn off, washed twice with water, and fractionally distilled. There was obtained 302 grams (84.6 per cent of the theoretical yield) of 2-chloroallyl chloride.

Example 3

A mixture of 147.5 grams (1.0 mol) of 1,2,3-trichloropropane, 37.7 grams (0.51 mol) of calcium hydroxide, and 500 grams (28 mols) of water was heated under reflux for 5 hours at a temperature of 88°–96° C. After completion of the reaction, the reaction product was distilled from the reactor, the layers of the distillate separated, and the lower layer washed and fractionally distilled. There was obtained 72 grams (0.49 mol) of unreacted 1,2,3-trichloropropane, and 45 grams (0.41 mol) of 2-chloroallyl chloride. The yield of 2-chloroallyl chloride was 80 per cent of theoretical based on the 1,2,3-trichloropropane consumed in the reaction.

Example 4

A mixture of 147.5 grams (1.0 mol) of 1,2,3-trichloropropane, 216 grams (2.04 mols) of sodium carbonate, and 500 grams (28 mols) of water was heated under reflux for 50 hours at a temperature of 95°–96° C. After completion of the reaction, the reaction product was distilled from the reactor and allowed to separate into two layers. The lower, water-insoluble layer was drawn off, washed with water, and the washings combined with the water layer of the distillate. 2-chloroallyl alcohol was salted out of the combined water solutions using potassium carbonate and was purified by fractional distillation. The yield of 2-chloroallyl alcohol was 80 percent of the theoretical, based on the 1,2,3-trichloropropane consumed in the reaction.

Example 5

A mixture of 147.5 grams (1.0 mol) of 1,2,3-trichloropropane, 171.4 grams (2.04 mols) of sodium bicarbonate, and 500 grams (28 mols) of water was heated under reflux for 50 hours as in Example 4. The temperature of reflux was 94°–96° C. The reacted mixture was distilled and 2-chloroallyl alcohol recovered from the distillate as in Example 4. The yield of 2-chloroallyl alcohol was 68 per cent of theoretical based on 1,2,3-trichloropropane consumed in the reaction.

Example 6

A mixture of 295 grams (2.0 mols) of 1,2,3-trichloropropane, 775.6 grams (2.04 mols) of trisodium phosphate ($Na_3PO_4 \cdot 12H_2O$), and 1000 grams (55.5 mols) of water was heated at 150° C. for 20 hours in a pressure reactor. After completion of the reaction, the reactor and contents were cooled and the reaction product distilled from the reactor. The organic layer of the distillate was washed with water, and the washings combined with the water layer. 2-chloroallyl alcohol was recovered from the water solution as in Example 4. The yield was 66 per cent of theoretical, based on the 1,2,3-trichloropropane consumed in the reaction.

Example 7

A mixture of 2664 grams (24.0 mols) of 2-chloroallyl chloride prepared as in Example 2, and 980 grams (24.5 mols) of sodium hydroxide dissolved in 3600 grams (200 mols) of water was heated under reflux for 10 hours at a temperature of 78°–84° C. The reaction mixture was distilled from the reactor and the lower layer of the distillate was washed with water and fractionally distilled. There was obtained di-(2-chloroallyl) ether, a colorless, mobile liquid distilling at approximately 114°–115° C. under 118 millimeters pressure, having a specific gravity of 1.180 at 20/4° C., and an index of refraction, $n^{20}_D = 1.4781$. Analysis of the product gave 42.37 per cent of chlorine, the theoretical being 42.73 per cent. Upon heating, the product polymerized to the rubber-like product hereinbefore described.

Example 1, above, illustrates the preparation of a mixture of 2-chloroallyl alcohol, 2-chloroallyl chloride, and di-(2-chloroallyl) ether by the hydrolysis of 1,2,3-trichloropropane, employing a dilute aqueous solution of an alkali as the hydrolytic agent.

Examples 2 and 3 show how the hydrolysis of 1,2,3-trichloropropane may be controlled so as to produce 2-chloroallyl chloride as the major product.

Examples 4 and 5 illustrate the use of salts of strong bases and weak acids as hydrolytic agents in the hydrolysis of 1,2,3-trichloropropane to produce 2-chloroallyl alcohol as the major product. Example 6 shows the use of elevated temperature and pressure in the process.

Example 7 illustrates the preparation of monomeric di(2-chloroallyl) ether by the alkaline hydrolysis of 2-chloroallyl chloride, and the preparation of the polymeric compound from the monomer.

This application is a continuation-in-part of our co-pending applications, Serial Nos. 167,630 and 167,631, each filed October 6, 1937.

Other modes of applying the principle of our invention may be employed, change being made as regards the method herein disclosed, or the materials employed, provided the step or steps stated by any of the following claims be employed or the product claimed in any of the following claims be obtained.

We therefore particularly point out and distinctly claim as our invention:

1. In a method for the preparation of 2-chloroallyl compounds, the step which consists in heating to a reaction temperature a mixture of 1,2,3-trichloropropane and a dilute aqueous solution of an alkaline agent.

2. In a method for the preparation of 2-chloroallyl compounds, the step which consists in heating to a reaction temperature a mixture of 1,2,3-trichloropropane and a dilute aqueous solution of an alkaline agent, and thereafter separating at least one product selected from the class consisting of 2-chloroallyl chloride, 2-chloroallyl alcohol and di-(2-chloroallyl) ether, from the mixture.

3. In a method for the preparation of 2-chloroallyl compounds, the step which consists in heating to a reaction temperature a mixture of 1,2,3-trichloropropane and a dilute aqueous solution of an alkali metal hydroxide.

4. In a method for the preparation of 2-chloroallyl compounds, the step which consists in heating to a reaction temperature a mixture of 1,2,3-trichloropropane and a dilute aqueous solution of an alkali metal hydroxide, and thereafter separating at least one product selected from the class consisting of 2-chloroallyl chloride, 2-chloroallyl alcohol, and di-(2-chloroallyl) ether, from the mixture.

5. In a method for the preparation of 2-chloroallyl compounds, the step which consists in heating to a reaction temperature a mixture of 1,2,3-trichloropropane and a dilute aqueous solution of sodium hydroxide, and thereafter separating at least one product selected from the class consisting of 2-chloroallyl chloride, 2-chloroallyl alcohol, and di-(2-chloroallyl) ether, from the mixture.

6. In a method of preparing 2-chloroallyl chloride, the step which consists in heating 1,2,3-trichloropropane to a reaction temperature with not more than two chemical equivalents of a dilute aqueous alkali.

7. In a method of preparing 2-chloroallyl chloride, the step which consists in heating 1,2,3-trichloropropane to a reaction temperature with not more than two chemical equivalents of a dilute aqueous alkali solution, and thereafter separating 2-chloroallyl chloride from the mixture.

8. In a method of preparing 2-chloroallyl chloride, the step which consists in heating 1,2,3-trichloropropane to a reaction temperature with a dilute aqueous alkali metal hydroxide solution containing not more than two chemical equivalents of the alkali, and thereafter separating 2-chloroallyl chloride from the mixture.

9. In a method of preparing 2-chloroallyl chloride, the step which consists in heating 1,2,3-trichloropropane to a reaction temperature with not more than two chemical equivalents of a dilute aqueous sodium hydroxide solution, and thereafter separating 2-chloroallyl chloride from the mixture.

10. In a method of preparing 2-chloroallyl alcohol, the step which consists in heating 1,2,3-trichloropropane to a reaction temperature with at least two chemical equivalents of a salt of a strong base and a weak acid in dilute aqueous solution.

11. In a method of preparing 2-chloroallyl alcohol, the step which consists in heating 1,2,3-trichloropropane to a reaction temperature with at least two chemical equivalents of a salt of a strong base and a weak acid in dilute aqueous solution, and thereafter separating 2-chloroallyl alcohol from the mixture.

12. In a method of preparing 2-chlorallyl alcohol, the step which consists in heating 1,2,3-trichloropropane to a reaction temperature with at least two chemical equivalents of an alkali metal carbonate in dilute aqueous solution, and thereafter separating 2-chloroallyl alcohol from the mixture.

13. Monomeric di-(2-chloroallyl) ether, a colorless liquid distilling at approximately 114°–115° C. under 118 millimeters pressure, having a specific gravity of approximately 1.180 at 20° C. and having the formula

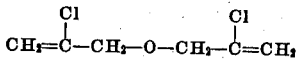

14. A process for preparing di-(2-chloroallyl) ether which comprises heating a mixture of 1,2,3-trichloropropane and at least 1.5 chemical equivalents of an alkali metal hydroxide in dilute aqueous solution.

15. A process for preparing di-(2-chloroallyl) ether which comprises heating a mixture of 1,2,3-trichloropropane and at least 1.5 chemical equivalents of sodium hydroxide in dilute aqueous solution and thereafter separating di-(2-chloroalkyl) ether from the mixture.

16. A process for preparing di-(2-chloroallyl) ether which comprises heating a mixture of 1,2,3-trichloropropane, and about a chemically equivalent proportion of sodium hydroxide in dilute aqueous solution, separating 2-chloroallyl chloride from the mixture, heating said 2-chloroallyl chloride with approximately one chemical equivalent of sodium hydroxide in dilute aqueous solution, and thereafter separating di-(2-chloroallyl) ether from the mixture.

GERALD H. COLEMAN.
ROBERT W. SAPP.